Feb. 11, 1969  M. E. WILKE  3,427,202
MAGNESIUM BATTERIES WITH IMPROVED CELL SEALS
AND INTERCELL CONNECTIONS AND
METHOD OF MAKING THE SAME
Filed July 11, 1966
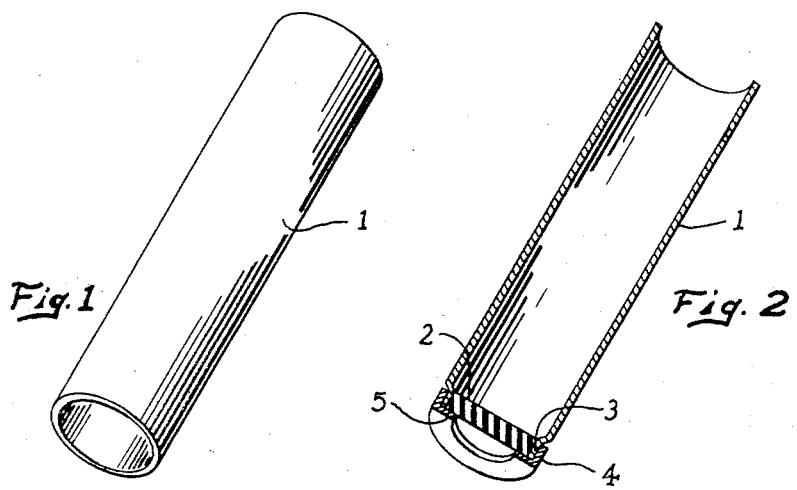
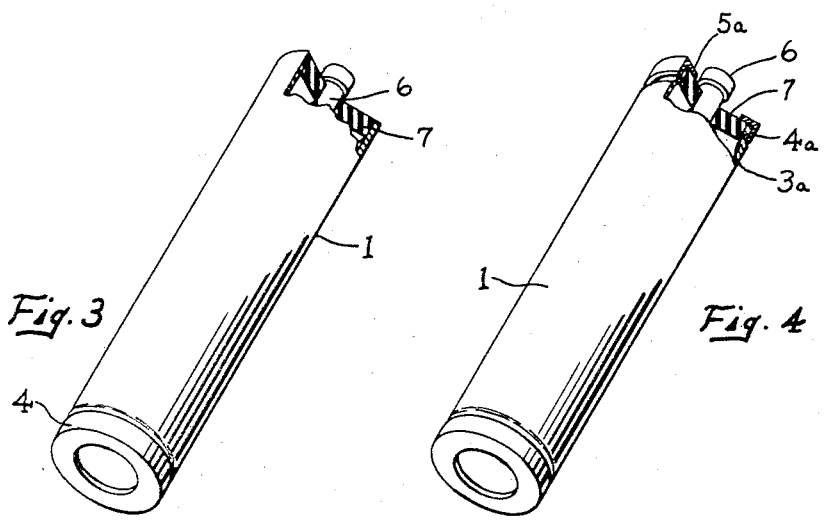
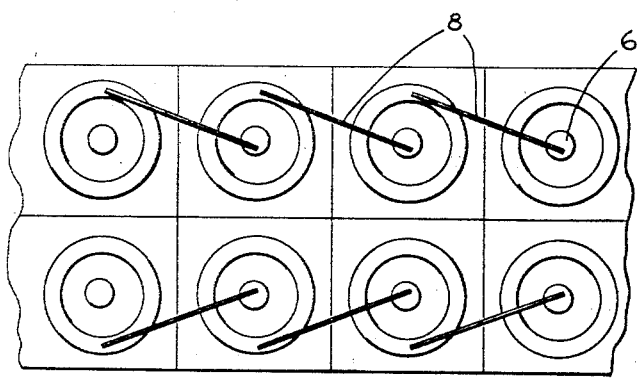
INVENTOR:
Milton E. Wilke United States Patent Office 3,427,202
Patented Feb. 11, 1969

3,427,202
MAGNESIUM BATTERIES WITH IMPROVED CELL SEALS AND INTERCELL CONNECTIONS AND METHOD OF MAKING THE SAME
Milton E. Wilke, Freeport, Ill., assignor to Clevite Corporation, a corporation of Ohio
Filed July 11, 1966, Ser. No. 564,206
U.S. Cl. 136—100     11 Claims
Int. Cl. H01m *1/02, 13/10*

ABSTRACT OF THE DISCLOSURE

An end of a dry cell having a negative electrode made from a magnesium cylinder is sealed by a combination consisting essentially of: a stiff resilient disk-shaped cover within the end of the cylinder, said cover being radially stressed in compression whereby to exert continuous pressure against the inside surface of the magnesium cylinder; and a ring of steel tightly encircling the end portion of the cylinder containing the compressed cover.

---

This invention relates to improvements in dry cells and batteries wherein magnesium is used as the anode metal, the invention being directed particularly to improved "can" and cell seal arrangements and improved intercell connecting means.

While magnesium has long been recognized as a metal having many advantages when employed as the negative electrode of the electrochemical systems of dry batteries, certain physical and chemical peculiarities of this metal make it more difficult to use than zinc. The particular problem aspects to which the present invention is directed include the difficulties in forming the deep cylindrical cans which are commonly used as both container and negative electrode of the individual cells and the need to provide relatively thick walls to insure against perforation and leakage of electrolyte from the cells. Magnesium also has a tendency to relax with time after placed under strain as, for example, in the formation of sealed closures at the tops of the cans. Another problem arises by reason of the difficulty of welding or soldering to magnesium for purposes of intercell connection in a battery comprising a plurality of cells.

The general object of this invention is to substantially reduce the cost of magnesium cells and batteries and enhance the reliability of such cells and batteries by improving the closure seals of the individual cells.

Particular objects of the invention include the improvement of the seals of cells having magnesium cans; the production of cylindrical magnesium negative terminals from magnesium tubing as an improvement over the forming of cans by extrusion or drawing of the metal, and the provision of metal surfaces electrically connected with the magnesium terminals to which intercell conductors may readily be welded or soldered.

These and other objects and advantages of the invention will be more fully understood from the following detailed description thereof in conjunction with the accompanying drawing wherein FIG. 1 is a perspective view of a length of magnesium tubing;

FIG. 2 is a perspective view, in cross section, of the length of tubing with the bottom end thereof closed and sealed in accordance with the invention;

FIG. 3 is a perspective view, partly in section, showing a cell almost completely assembled;

FIG. 4 is a perspective view, partly in section, showing the completed cell, and FIG. 5 is a more or less diagrammatic plan view of a multicell battery showing the intercell connections.

It will be understood that the advantages of the invention may be realized in conjunction with the use of conventional drawn or extruded cylindrical cans which, being well-known, are not separately illustrated. For the purposes of the invention, the can illustrated in FIG. 2, having its bottom end close and sealed, is the full equivalent of a conventional drawn or extruded can.

The can of FIG. 2 is made from a length of magnesium tubing 1 which is cut to the desired length from standard magnesium tubing. A disk 2 of a suitable stiff but somewhat resilient plastic composition is inserted into the bottom end of the tubing after which the bottom end portion of the tubing which is engaged by the periphery of disk 2 is reduced in diameter by means of a suitable tool which applies radial pressure to this end portion of tubing 1 and to the body of disk 2 to compress the latter and place it under radial strain. The composition and thickness of disk 2 is such that upon removal of the forming tool, the end portion of magnesium tubing 1 will retain its deformed shape with reduced diameter and the interface between disk 2 and portion 3 of the tubing will be subject to sealing pressure due to the compressed resilience of disk 2. To complete the closure, a ring 4 of steel or other suitable material is forced onto the reduced portion 3 of magnesium tubing 1. To facilitate the application of ring 4 to the bottom end of tubing 1, the end portion 3 and/or the engaging portion of ring 4 may be slightly tapered. A flange 5 may be provided as an integral part of ring 4 to engage the end of tubing 1 and thus serve as a stop and also to provide support for disk 2 to prevent outward movement or bulging of the disk.

When the bottom closure is completed, ring 4 is firmly fixed in position. It prevents any enlargement of the reduced end portion 3 of the tubing due to relaxation of the magnesium and ensures a permanently sealed closure for the bottom end of the tubing. Thus, a "can" is formed for the reception of the contents of the dry cell.

The materials and parts of the cell are then inserted into the can. Included is the usual brass-capped positive terminal 6 which emerges from the cell through a hole in washer 7. This washer may be similar in composition to disk 2, suitably a stiff and somewhat resilient plastic material. Although, as will be seen by reference to FIG. 4, the completely assembled cell includes a top seal construction similar to that described for the bottom of the tubing, FIG. 2, the uncompleted cell, as shown in FIG. 3, is, in accordance with one aspect of the invention, permitted to stand for a suitable length of time, say four or five days, to permit gases which initially form upon the bringing together of the several component parts and materials of the cell to escape from the cell prior to the final sealing. To this end, the hole in the center of disk 7 to receive terminal rod 6 is dimensioned to provide a snug but not a sealing pressure fit. Similarly, the outside diameter of disk 7 is such that the disk, when inserted into the top end portion of tube 1 will hold its position, but is not under sealing pressure at the interface of the disk and the tube. Under these conditions, gases under only slight pressure within the cell may escape past disk 7 to the atmosphere.

After aging, the top seals of the cells are completed in a manner similar to that described with reference to the bottom closures of the tubing. The top portion of the tubing, along with the body of disk 7, is subjected to inward radial pressure which permanently deforms the metal as the diameter of this portion is reduced. A ring 4a, preferably having a flange 5a, is then forced upon the reduced portion 3a of the top end of tube 1. The result is a permanent pressure seal at the engaging surfaces of disk 7 with terminal 6 and the inside surface of reduced portion 3a of the magnesium tube 1.

Electrical connection of the several cells of a multicell battery, such as that shown more or less diagrammatically in FIG. 5, is greatly facilitated by the use of top closure rings 4a as a base for soldering or welding the intercell conductors 8. The vexing problem of securely and electrically connecting such intercell conductors to the magnesium negative electrodes of the cells is eliminated. Rings 4a intimately engage the top portions of the magnesium tubes, providing assured electrical connection between the rings and the magnesium cell terminals, and the intercell conductors 8, welded or soldered at one of their ends to the positive terminals 6, may be welded or soldered either to the cylindrical portions of rings 4a or, as is shown in FIG. 5, to the flanges 5a at the tops of the cells, whichever is more convenient. The end result is a more dependable, yet less costly, battery.

Invention is claimed as follows:

1. In a dry cell having a cylindrical negative electrode of magnesium, and a seal closure for an end of said electrode, the improvement in which the seal closure consists essentially of a disk-shaped cover of plastic material having stiffness and resilience arranged within the end portion of said electrode to close the same, said covering being under radial compression whereby to exert continuous pressure radially outwardly against the engaging inside surface of said electrode, and a ring of steel tightly encircling said end portion of said electrode to prevent enlargement of the same.

2. A dry cell in accordance with claim 1 and including an electrical conductor permanently affixed and electrically connected to the ring for electrical connection with the negative electrode.

3. A dry cell in accordance with claim 1 wherein the ring has a flange integral therewith and extending inwardly over the encircled end of the negative electrode and the peripheral portion of the disk-shaped closure member.

4. A dry cell in accordance with claim 3 and including an electrical conductor permanently affixed and electrically connected to the flange for electrical connection with the negative electrode.

5. A dry cell in accordance with claim 1 wherein the disk-shaped closure member is a solid disk and is arranged at the bottom end of the cylindrical negative electrode to provide a bottom seal closure for the cell.

6. A dry cell in accordance with claim 1 wherein the cell includes an axial positive terminal rod and the disk-shaped cover is provided with a hole at the center thereof through which said terminal rod passes from the interior to the exterior of the cell, said cover being arranged at the top end of the cylindrical negative electrode to provide a top seal closure for the cell.

7. A dry cell of claim 1 in which said seal closure is arranged both at the bottom end and at the top end of the cylindrical negative electrode to provide top and bottom seal closures, respectively, for the cell, said cylindrical negative electrode being a length of tubing initially open at both ends.

8. In a dry cell having a negative electrode can of magnesium and an axial positive terminal rod, a top seal can closure consisting essentially of a washer-shaped cover of plastic material having stiffness and resilience arranged within the top portion of said can to close the same, said positive terminal rod passing through the hole in said cover, said cover being radially stressed in compresion whereby to exert continuous pressure against the surfaces of said can and said rod engaged thereby to seal the joints therewith, and a ring of steel tightly encircling said top portion of said can to prevent enlargement of the same.

9. A battery comprising a plurality of cells each having the structure of claim 8 and including an intercell connecting conductor permanently affixed and electrically connected to the steel ring of each cell for electrical connection with the can as the negative terminal of the cell.

10. The method of making a dry cell having the structure of claim 8 including the steps of inserting the parts and materials which are to be enclosed within the cell into the can, inserting the positive terminal rod and the washer-shaped cover in unstressed condition into the can, allowing the cell to age until gases formed therein have escaped past the closure member to the atmosphere, applying inwardly directed radial pressure to the top portion of the can to reduce the diameter thereof and compress the resilient cover and thereby establish sealing pressure at the cover-rod and cover-can interfaces, and finally applying a ring of steel tightly over said end portion of the said can to prevent enlargement of the same.

11. The method of making an end seal of a dry cell made from a magnesium cylinder including the steps:

(a) inserting a stiff, resilient disk into the end portion of the cylinder, whereby the end portion of the cylinder is engaged by the periphery of the disk;

(b) reducing the diameter of the end portion of the cylinder which is engaged by the periphery of the disk, whereby the disk is compressed and placed under radial strain, and the interface between the disk and end portion are subject to sealing pressure due to the compressed resilience of the disk; and (c) finally forcing a ring of steel onto the reduced portion of the magnesium cylinder.

References Cited

UNITED STATES PATENTS

| | | | |
|---|---|---|---|
| 2,643,278 | 6/1963 | Simpson | 136—133 |
| 1,342,001 | 6/1920 | Schulte | 136—135 |
| 2,541,931 | 2/1951 | McEachron et al. | 136—133 |
| 2,616,940 | 11/1952 | Reid | 136—100 |
| 3,342,644 | 9/1967 | Jammet | 136—133 |

FOREIGN PATENTS

| | | |
|---|---|---|
| 4,512 | 1882 | Great Britain. |
| 531,883 | 11/1921 | France. |

WINSTON A. DOUGLAS, *Primary Examiner.*

DONALD L. WALTON, *Assistant Examiner.*

U.S. Cl. X.R.

136—133, 135, 175